(12) United States Patent
Lee

(10) Patent No.: US 8,975,860 B2
(45) Date of Patent: Mar. 10, 2015

(54) ELECTROMAGNETIC TOUCH INPUT PEN HAVING A USB INTERFACE

(75) Inventor: Cheng-Hao Lee, Taipei (TW)

(73) Assignee: E Ink Holdings Inc., Hsinchu (TW)

( * ) Notice: Subject to any disclaimer, the term of this patent is extended or adjusted under 35 U.S.C. 154(b) by 270 days.

(21) Appl. No.: 12/954,969

(22) Filed: Nov. 29, 2010

(65) Prior Publication Data

US 2012/0133327 A1    May 31, 2012

(51) Int. Cl.
*H02J 7/00*    (2006.01)
*G06F 3/0354*    (2013.01)

(52) U.S. Cl.
CPC ..... *G06F 3/03545* (2013.01); *H02J 2007/0062* (2013.01)
USPC .......................................................... 320/103

(58) Field of Classification Search
CPC ...... H02J 7/0042; H02J 7/0049; H02J 7/0054
USPC .................................. 320/103, DIG. 21, 107
See application file for complete search history.

(56) References Cited

U.S. PATENT DOCUMENTS

| | | | | |
|---|---|---|---|---|
| 5,576,612 | A | * | 11/1996 | Garrett et al. ................. 320/106 |
| 5,641,587 | A | * | 6/1997 | Mitchell et al. ................. 429/90 |
| 6,762,584 | B2 | * | 7/2004 | Harvey .......................... 320/107 |
| 7,376,846 | B2 | * | 5/2008 | Hawkins et al. .............. 713/300 |
| 7,567,241 | B2 | * | 7/2009 | King et al. ..................... 345/179 |
| 8,362,910 | B2 | * | 1/2013 | Lee .......................... 340/636.19 |
| D676,049 | S | * | 2/2013 | Lee et al. ..................... D14/411 |
| 8,576,556 | B2 | * | 11/2013 | Lee et al. ................. 361/679.27 |
| 2006/0197755 | A1 | * | 9/2006 | Bawany ....................... 345/179 |
| 2010/0129131 | A1 | * | 5/2010 | Liu ............................... 401/109 |
| 2011/0279081 | A1 | * | 11/2011 | Cacioppo et al. ............. 320/108 |

* cited by examiner

*Primary Examiner* — Richard V Muralidar
(74) *Attorney, Agent, or Firm* — Guice Patents PLLC

(57) ABSTRACT

An electromagnetic touch input pen having a USB interface, used to provide touch input to an information processing device, the pen including: an electromagnetic touch input pen, having a battery module; and a USB plug, coupled with the battery module, wherein the battery module can access a charging power with the USB plug inserted into a USB socket of the information processing device.

5 Claims, 4 Drawing Sheets

ELECTROMAGNETIC TOUCH INPUT PEN HAVING A USB INTERFACE

BACKGROUND OF THE INVENTION

1. Field of the Invention

The present invention relates to a touch input pen, especially to an electromagnetic touch input pen having a USB interface.

2. Description of the Related Art

As is known, a touch module, if placed over a display panel, has to be implemented with transparent materials like glass and ITO (Indium Tin Oxside), so as not to hinder the display of the display panel. However, if the display panel is an electrophoretic one—utilizing surrounding lighting for illumination, then the illumination attenuation caused by the touch module can still degrade the display brightness, even though the touch module is made of transparent materials. As such, the electrophoretic display panel is placed in general over the touch module.

Besides, to avoid damaging the display panel which overlies the touch module, when performing touch input, non-contact mechanism such as magnetic touch sensing mechanism is commonly utilized for the touch module. The magnetic touch sensing mechanism demands a digital input pen which is generally powered by rechargeable batteries. When the battery power of the digital input pen is exhausted, a charger is then needed to charge up the rechargeable batteries. Please refer to FIG. 1, which is a perspective view illustrating an appearance of a prior art digital input pen being charged by a specific charger. As illustrated in FIG. 1, a digital input pen 100 is placed on a charger 110 to have its rechargeable batteries charged. However, using the charger 110 to charge the rechargeable batteries inside the digital input pen 100 has a disadvantage—the user has to carry the charger 110 with him/her, otherwise the rechargeable batteries can not get charged.

To overcome the mentioned disadvantage of charging a digital input pen with a specific charger, the present invention proposes a novel electromagnetic touch input pen, which can access a DC power via a USB interface to charge the rechargeable batteries.

SUMMARY OF THE INVENTION

One objective of the present invention is to disclose an electromagnetic touch input pen having a USB interface, capable of accessing a DC power via a USB interface to charge the rechargeable batteries.

Another objective of the present invention is to disclose an electromagnetic touch input pen having a USB plug, utilized to provide touch input to an information processing device, wherein the USB plug is mated with a USB socket of the information processing device, so that when the rechargeable batteries of the electromagnetic touch input pen need to be charged, the charging power can be accessed by simply inserting the USB plug into the USB socket, eliminating the need of a specific charger for the electromagnetic touch input pen.

To attain the foregoing objectives, the present invention proposes an electromagnetic touch input pen having a USB plug, which includes an electromagnetic touch input pen, a charging indicator light, and a USB plug.

In the proposal of the present invention, the electromagnetic touch input pen, used to provide touch input to a touch screen of an information processing device, is powered by a battery module inside the electromagnetic touch input pen.

The battery module can contain at least one rechargeable battery which can be for example but not limited to a Ni—Cd battery, a Ni-MH battery, a Li-ion battery, or a Li-polymer battery. To charge the at least one rechargeable battery, the battery module further includes a charger circuit, which is capable of utilizing an external DC power source to provide a charging process.

The charging indicator light is coupled to the charger circuit to indicate charging status with bright/dark, different flickering frequencies, or different colors representing in-charging/fully-charged respectively.

The USB plug can be of type A, type B, Mini type A, Mini type B, Micro type A, or Micro type B, wherein both type A and type B have four contacts—contact 1($V_{BUS}$), contact 2(D−), contact 3(D+), and contact 4(GND), and Mini type A, Mini type B, Micro type A, and Micro type B all have five contacts—contact 1($V_{BUS}$), contact 2(D−), contact 3(D+), contact 4(ID), and contact 5(GND). The $V_{BUS}$ contact and the GND contact of the USB plug are coupled to the charger circuit, and when the USB plug is connected with a corresponding USB socket of the information processing device, the charger circuit can then access a typically 5V DC power source via the $V_{BUS}$ contact and the GND contact, to provide a charging process for the battery module.

To make it easier for our examiner to understand the objective of the invention, its structure, innovative features, and performance, we use a preferred embodiment, together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 1:
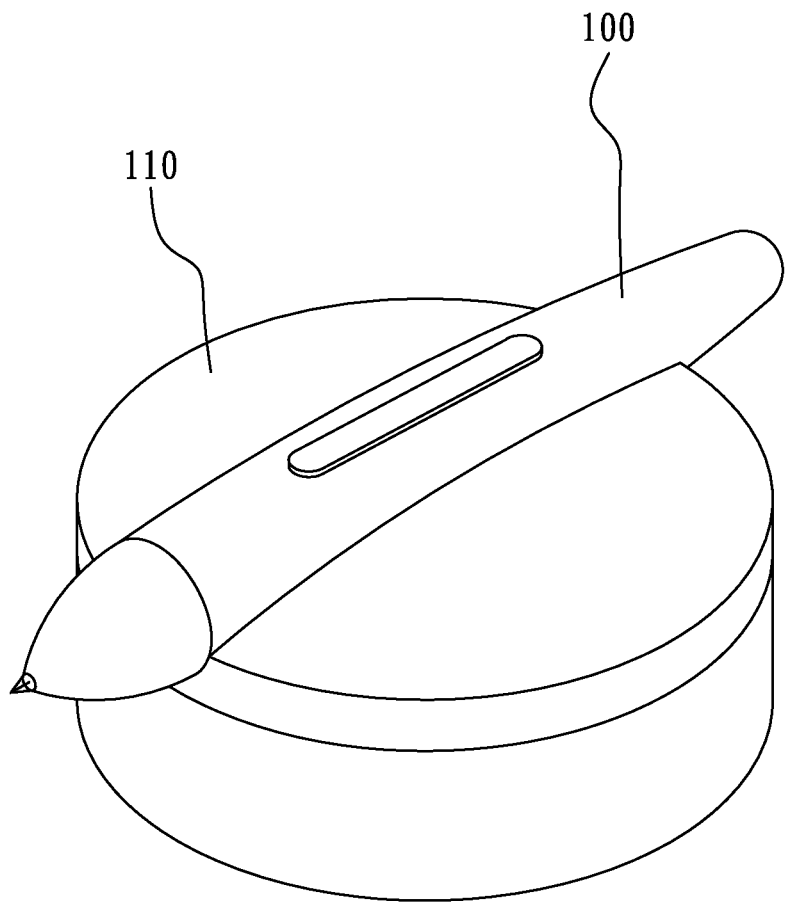
FIG. 1 is a perspective view illustrating an appearance of a prior art digital input pen being charged by a specific charger.
Figure 2:
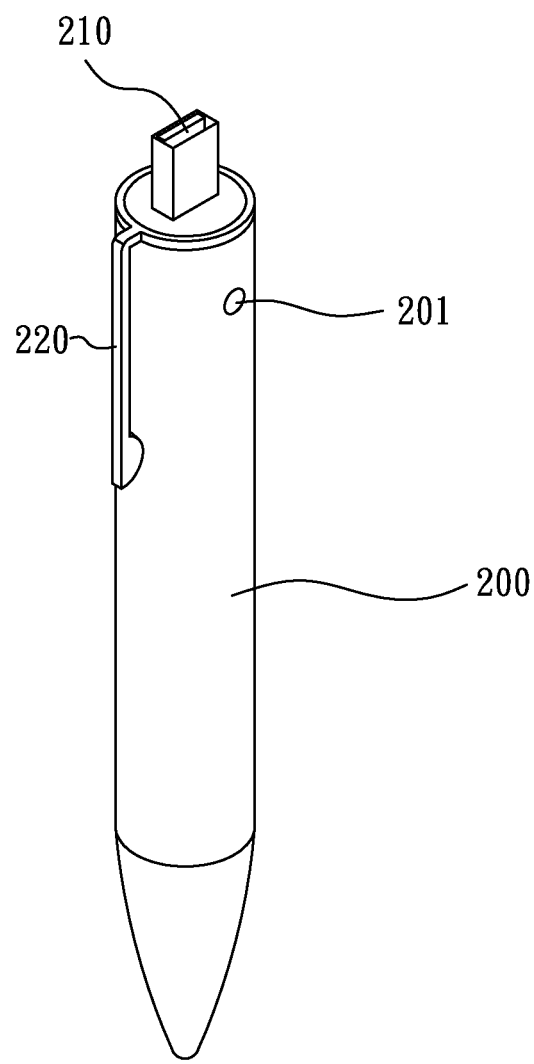
FIG. 2 is a perspective view of an electromagnetic touch input pen having a USB interface according to a preferred embodiment of the present invention.

Please refer to FIG. 2, which is a perspective view of an electromagnetic touch input pen having a USB interface according to a preferred embodiment of the present invention. As illustrated in the figure, the electromagnetic touch input pen having a USB interface includes an electromagnetic touch input pen 200, a charging indicator light 201, and a USB plug 210. The electromagnetic touch input pen has a clip 220 having a top end formed as a ring. The ring is surrounding a periphery of a top end of the electromagnetic touch input pen and connected thereto. The clip 220 is located between the USB plug 210 and the charging indicator light 201.

The electromagnetic touch input pen 200, used to provide touch input to a touch screen of an information processing device, is powered by a battery module inside the electromagnetic touch input pen 200. The batteries of the battery module can be primary batteries, for example but not limited to alkaline batteries, or rechargeable batteries, for example but not limited to Ni—Cd batteries, Ni-MH batteries, Li-ion batteries, or Li-polymer batteries. If the batteries of the battery module are primary batteries, then a replacement for the batteries is required when the battery power is exhausted; if the batteries of the battery module are rechargeable batteries, then a charging process is required for the rechargeable batteries when the battery power is exhausted. As such, the battery module further includes a charger circuit, which is capable of utilizing an external DC power source to provide a charging process for the rechargeable batteries.

The charging indicator light 201 is coupled to the charger circuit to indicate charging status—with bright/dark, different flickering frequencies, or different colors representing in-charging/fully-charged respectively.

The USB plug 210 can be of type A, type B, Mini type A, Mini type B, Micro type A, or Micro type B, wherein both type A and type B have four contacts—contact 1($V_{BUS}$), contact 2(D−), contact 3(D+), and contact 4(GND), and Mini type A, Mini type B, Micro type A, and Micro type B all have five contacts—contact 1($V_{BUS}$), contact 2(D−), contact 3(D+), contact 4(ID), and contact 5(GND). The $V_{BUS}$ contact and the GND contact of the USB plug 210 are coupled to the charger circuit, and when the USB plug 210 is connected with a corresponding USB socket of the information processing device, the charger circuit can then access a typically 5V DC power source via the $V_{BUS}$ contact and the GND contact, to provide a charging process for the battery module.

Figure 3:
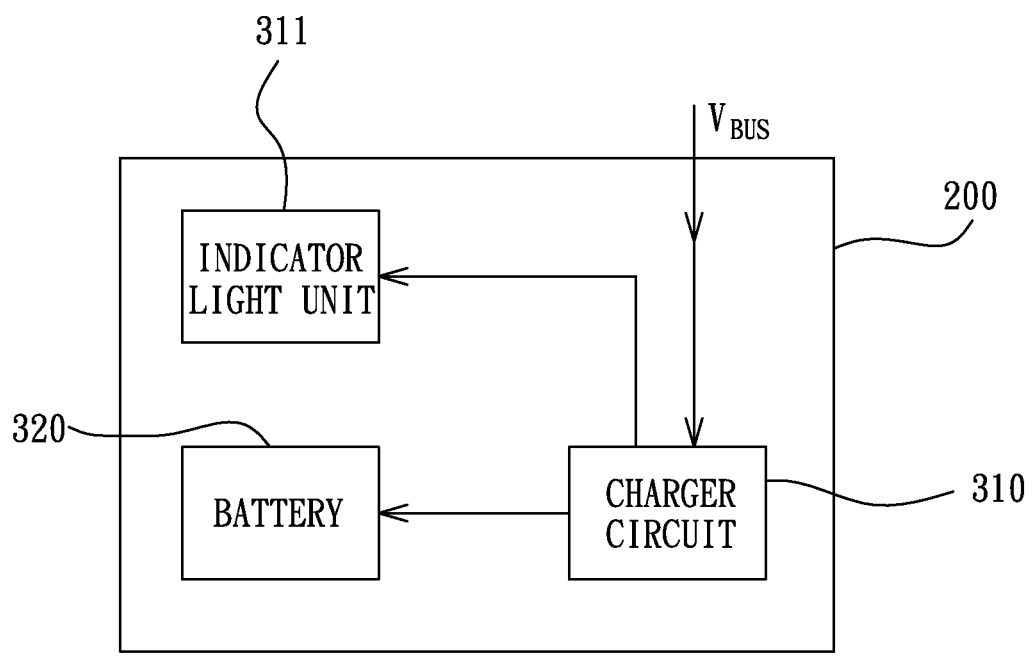
FIG. 3 illustrates a block diagram of a battery module inside the electromagnetic touch input pen of FIG. 2 according to a preferred embodiment of the present invention.

FIG. 3 illustrates a block diagram of a battery module inside the electromagnetic touch input pen 200 according to a preferred embodiment of the present invention. As illustrated in FIG. 3, the battery module includes a charger circuit 310, an indicator light unit 311, and a battery 320.

The charger circuit 310 is capable of utilizing the DC power source $V_{BUS}$ to provide an appropriate charging process for the battery 320. The appropriate charging process can be a constant voltage charging process, a constant current charging process, a constant current constant voltage charging process, a pulse-wise charging process, or a Reflex charging process, wherein the constant current constant voltage charging process charges the battery 320 with a constant current for a first period and then with a constant voltage for a second period; the pulse-wise charging process uses repetitive charging current pulses instead of continuous constant charging current for the battery 320; and the Reflex charging process adds a short discharging period after each of the repetitive charging current pulses for the battery 320. The charger circuit 310 can also output a charging status indicating signal to represent in-charging or fully-charged by detecting the voltage and/or current of the battery 320.

The indicator light unit 311, coupled to the charger circuit 310, is used for driving the charging indicator light 201 in response to the charging status indicating signal, to indicate in-charging/fully-charged with bright/dark, a first flickering frequency/a second flickering frequency, or a first color/a second color.

The battery 320 contains at least one battery, which can be for example but not limited to Ni—Cd battery, Ni-MH battery, Li-ion battery, or Li-polymer battery.

Figure 4:
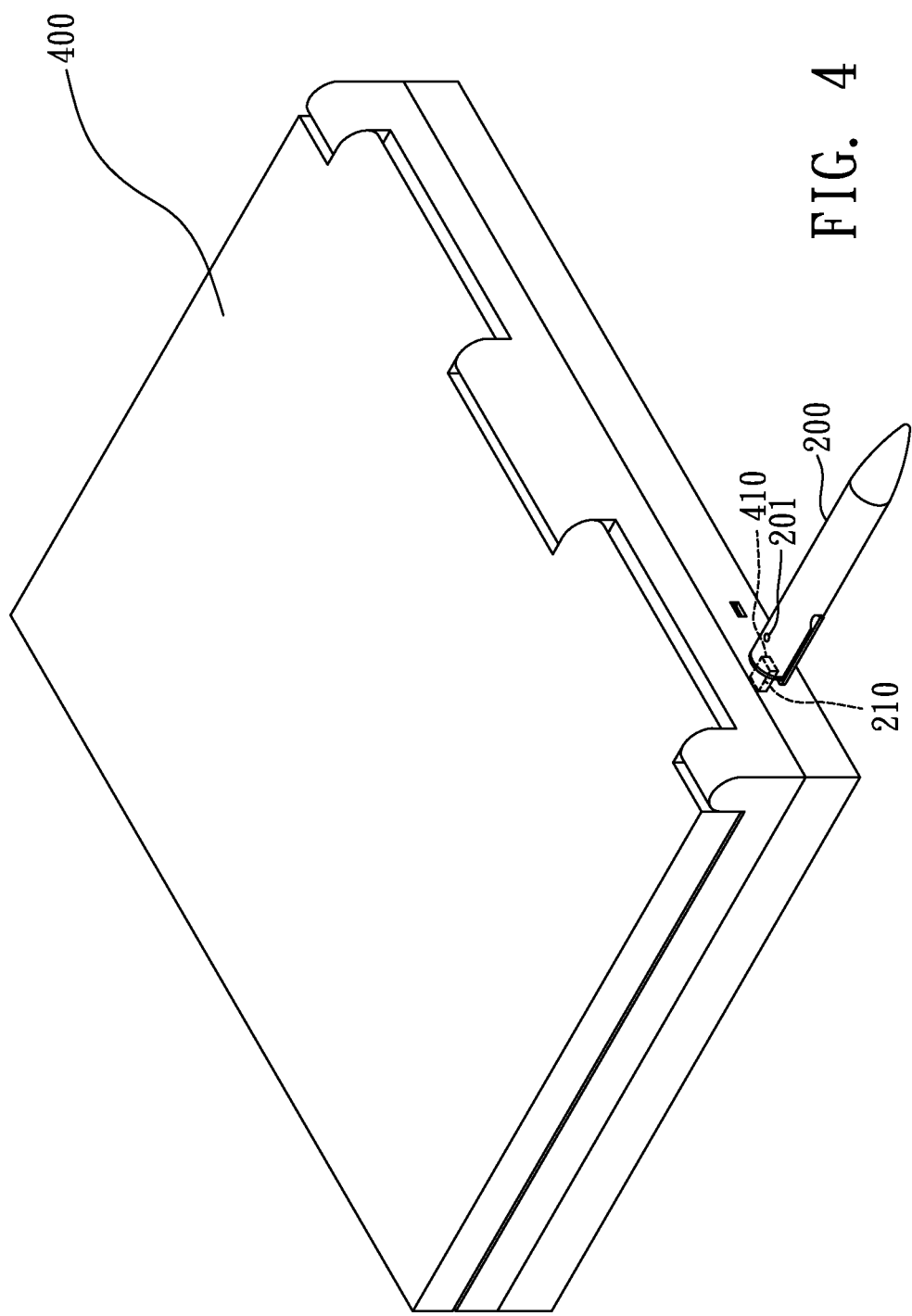
FIG. 4 is a perspective view illustrating an electromagnetic touch input pen of the present invention getting charged through the connection of a USB plug with a USB socket of an information processing device.

In fact, when the electromagnetic touch input pen 200 needs to be charged, it can access a charging power by simply connecting the USB plug 210 with a mated USB socket which provides a typically 5V DC power source. FIG. 4 is a perspective view illustrating the electromagnetic touch input pen 200 getting charged through the connection of the USB plug 210 with a USB socket 410 of an information processing device 400. The information processing device 400 can be a notebook PC (Personal Computer), a desktop PC, a flat panel PC, or a palmtop PC. Besides, with the help of the charging indicator light 201, the user can identify the charging status of the electromagnetic touch input pen 200.

In conclusion, the electromagnetic touch input pen having a USB interface of the present invention, used to provide touch input to a touch screen of an information processing device, can access a charging power through the connection of its USB plug with a USB socket of the information processing device, without the need of additional specific charger. Therefore, the present invention does conquer the disadvantage of prior art electromagnetic touch input pen.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. An electromagnetic touch input pen assembly used to provide a touch input to an information processing device, said electromagnetic touch input pen assembly comprising:
   an electromagnetic touch input pen having a USB interface, a battery module, and a USB plug coupled with said battery module, said battery module comprises at least one rechargeable battery;
   wherein said battery module accessing a charging power and charging said at least one rechargeable battery when said USB plug is directly connected to a USB socket of said information processing device;
   wherein said rechargeable battery is selected from a group consisting of Ni-MH battery, and Li-polymer battery;
   wherein said USB plug is located on a top end of said electromagnetic touch input pen and a charging indicator light is located on a top portion of an exterior periphery of said electromagnetic touch input pen adjacent to the USB plug;
   wherein said electromagnetic touch input pen has a clip having a top end formed as a ring, said ring is connected to a periphery of the top end of said electromagnetic touch input pen;
   wherein said ring of said clip is located between the USB plug and the charging indicator light.

2. An electromagnetic touch input pen assembly used to provide a touch input to an information processing device, said electromagnetic touch input pen assembly comprising:
   an electromagnetic touch input pen having a USB interface, a battery module, and a USB plug coupled with said battery module, said battery module comprises at least one rechargeable battery;
   wherein said battery module accessing a charging power and charging said at least one rechargeable battery when said USB plug is directly connected to a USB socket of said information processing device;
   wherein said battery module further comprises a charger circuit coupled to said USB plug and said at least one rechargeable battery respectively and providing a Reflex charging process;

wherein said USB plug is located on a top end of said electromagnetic touch input pen and a charging indicator light is located on a top portion of an exterior periphery of said electromagnetic touch input pen adjacent to the USB plug;

wherein said electromagnetic touch input pen has a clip having a top end formed as a ring, said ring is connected to a periphery of the top end of said electromagnetic touch input pen;

wherein said ring of said clip is located between the USB plug and the charging indicator light.

3. The electromagnetic touch input pen assembly of claim 2, wherein said battery module further comprises an indicator light unit for driving said charging indicator light in response to a charging status indicating signal from said charger circuit to indicate in-charging with a first flickering frequency and fully charged with a second flickering frequency.

4. An electromagnetic touch input pen assembly used to provide a touch input to an information processing device, said electromagnetic touch input pen assembly comprising:

an electromagnetic touch input pen having a USB interface, a battery module, and a USB plug coupled with said battery module, said battery module comprises at least one rechargeable battery;

wherein said battery module accessing a charging power and charging said at least one rechargeable battery when said USB plug is directly connected to a USB socket of said information processing device;

wherein said USB plug is selected from a group consisting of type B, Micro type A, and Micro type B;

wherein said USB plug is located on a top end of said electromagnetic touch input pen and a charging indicator light is located on a top portion of an exterior periphery of said electromagnetic touch input pen adjacent to the USB plug;

wherein said electromagnetic touch input pen has a clip having a top end formed as a ring, said ring is connected to a periphery of the top end of said electromagnetic touch input pen;

wherein said ring of said clip is located between the USB plug and the charging indicator light.

5. An electromagnetic touch input pen assembly used to provide a touch input to an information processing device, said electromagnetic touch input pen assembly comprising:

an electromagnetic touch input pen having a USB interface, a battery module, and a USB plug coupled with said battery module, said battery module comprises at least one rechargeable battery;

wherein said battery module accessing a charging power and charging said at least one rechargeable battery when said USB plug is directly connected to a USB socket of said information processing device;

wherein said information processing device is selected from a group consisting of a notebook PC, a desktop PC, a palmtop PC, and a flat panel PC;

wherein said USB plug is located on a top end of said electromagnetic touch input pen and a charging indicator light is located on a top portion of an exterior periphery of said electromagnetic touch input pen adjacent to the USB plug;

wherein said electromagnetic touch input pen has a clip having a top end formed as a ring, said ring is connected to a periphery of the top end of said electromagnetic touch input pen;

wherein said ring of said clip is located between the USB plug and the charging indicator light.

* * * * *